US011895987B1

United States Patent
Dietrich

(10) Patent No.: US 11,895,987 B1
(45) Date of Patent: Feb. 13, 2024

(54) UNIVERSAL QUICK RELEASE

(71) Applicant: Kyle Dietrich, North Royalton, OH (US)

(72) Inventor: Kyle Dietrich, North Royalton, OH (US)

(*) Notice: Subject to any disclaimer, the term of this patent is extended or adjusted under 35 U.S.C. 154(b) by 506 days.

(21) Appl. No.: 16/523,443

(22) Filed: Jul. 26, 2019

Related U.S. Application Data

(63) Continuation-in-part of application No. 15/349,448, filed on Nov. 11, 2016, now abandoned.

(51) Int. Cl.
*A01K 27/00* (2006.01)

(52) U.S. Cl.
CPC .......... *A01K 27/005* (2013.01); *A01K 27/001* (2013.01); *A01K 27/003* (2013.01); *A01K 27/002* (2013.01)

(58) Field of Classification Search
USPC ....... 119/720, 776, 721, 769, 772, 795, 855, 119/770; D30/153; 54/69
See application file for complete search history.

(56) References Cited

U.S. PATENT DOCUMENTS

| | | | | |
|---|---|---|---|---|
| 3,505,979 A * | 4/1970 | Rosswag | ............. | A01K 27/005 119/772 |
| 4,530,310 A * | 7/1985 | Clarke | ............. | A01K 27/005 119/776 |
| 4,747,185 A * | 5/1988 | Thacker | ............. | A22B 3/06 452/58 |
| 4,903,638 A * | 2/1990 | Lacey | ............. | A01K 27/005 119/776 |
| 5,620,298 A * | 4/1997 | Barwise | ............. | B66C 1/585 294/201 |
| 5,806,468 A * | 9/1998 | Ryder | ............. | A01K 27/005 119/776 |
| 5,852,988 A * | 12/1998 | Gish | ............. | A01K 27/003 119/795 |
| 7,367,287 B1 * | 5/2008 | Jones, Jr. | ............. | A01K 27/005 119/798 |
| 11,147,243 B2 * | 10/2021 | Soto | ............. | A01K 27/001 |
| 2016/0215812 A1 * | 7/2016 | Durfee | ............. | F16B 45/04 |
| 2016/0286764 A1 * | 10/2016 | Clark | ............. | A01K 27/005 |
| 2018/0235180 A1 * | 8/2018 | Gardner | ............. | A01K 27/005 |

FOREIGN PATENT DOCUMENTS

| | | | | |
|---|---|---|---|---|
| CN | 202910859 | * | 2/2012 | |
| DE | 202015003787 | * | 6/2014 | ............. A01K 27/00 |
| DE | 202014002889 | * | 9/2015 | ............. F16B 45/00 |

* cited by examiner

*Primary Examiner* — Andrea M Valenti
(74) *Attorney, Agent, or Firm* — GUGLIOTTA & GUGLIOTTA LPA

(57) ABSTRACT

A remotely operable quick release is provided that may be placed between a collar or harness to release an animal or object. A nylon strap with a D-ring on one end attaches to a holding device. On the other end supports a flip latch attached to a harness. The release mechanism on the top of the strap includes a push pull piston solenoid. A metal slider urged by the solenoid holds prevents the flip latch from releasing. When the solenoid is activated the piston and slider pull back to release the flip latch. The solenoid is operated with a wireless remote control receiver transmitter key fob. When the button is push it activates the solenoid which pulls the piston and slider back to free the flip latch. Resetting the flip latch is accomplished by pushing down on the slider and allowing the piston to slide forward to re-engage.

7 Claims, 2 Drawing Sheets

UNIVERSAL QUICK RELEASE

RELATED APPLICATIONS

The present application is a Continuation in Part of U.S. Ser. No. 15/349,448, filed on Nov. 11, 2016 and incorporated by reference as if fully rewritten herein.

BACKGROUND OF THE INVENTION

1. Field of the Invention

The present invention relates generally to small animal collars and, more particularly, to an improved, quick release strap for use with police, military or detection dogs.

2. Description of the Related Art

Police, Military or Detection animals are highly trained canines that are used as tools for and extensions of their human handlers. These animals are specifically trained to assist police and other law-enforcement personnel in their work. Their duties include searching for drugs and explosives, searching for lost people, looking for crime scene evidence, searching buildings, tracking suspects and protecting their handlers.

The training of these animals may include a number of specialty behaviors or tactics. Sentry or patrol dogs are used to locate and subdue suspects or enemy and to provide security for sensitive or controlled areas. Search and rescue (SAR) dogs are used to locate suspects or find missing people or objects. Detection dog or explosive-sniffing dogs are used to detect illicit substances such as drugs or explosives which may be carried on a person in their effects. Arson dogs are trained to pick up on traces of accelerants at sites of suspected arson. Cadaver dogs are trained in detecting cadaverine and other odors of decomposing bodies.

Before deployment these animals are trained for their specific tasks and to do so based upon specific commands. However, during exigent circumstances the handlers may encounter common problems associated with releasing of the canine animals. The dogs are generally restrained by their handlers on a collar or leash due to the fact that when stimulated the dogs may charge or pull before a command is initiated. In utilizing existing collar and leash combinations, when a forward action is commanded the handler is faced with one of two actions, either of which may cause problems. First, the handler may merely release the manual grip on the leash to release the canine. This, however, poses a snag risk that may prevent the canine from reaching its destination. Second, and most common, the handler can simply manually release a spring returned clasp that connects the distal end of the leash to the canine's collar. This, however, may result in a loss of meaningful time as the handler recoils the dog to within reach in order to manually detatch the leash. Such a delay may provide the time for a perpetrator to escape.

Consequently, a need has been felt for providing an apparatus, system and method which allows for a quick-release detachment of a leash from a collar of such an canine from its leash in a manner that prevents the handler from having to retrieve the canine to within arms length in order to manually detach a leash.

SUMMARY OF THE INVENTION

It is thus an object of the present invention to provide an apparatus for and method of releasing an animal leash from its attachment to an animal collar.

It is a further object of the present invention to provide a quick release mechanism that can detach two clasped items in an automated manner.

It is still a further object of the present invention to provide an animal release leash that can be activated from the leash's handler gripping end with a push of a button.

Briefly described according to the present invention, a universal quick release is provided that may be placed between a collar or harness to release an animal or object. A remotely operable quick release is provided that may be placed between a collar or harness to release an animal or object. A nylon strap may be provided with a D ring on one end to attach to a leash, rope, chain or any similar or equivalent restraint or holding device. On the other end of the strap is affixed a flip latch that can be attached to a harness, collar or ring to freely release the animal or object. The release mechanism may include a push pull piston solenoid or a gear motor. Attached to the end of the piston or gear motor is a slider that holds the flip latch and preventing it from releasing. When the solenoid is activated or gear motor rotated the piston slider is pulled back to release the flip latch.

The solenoid or gear motor may be operated with a wireless remote control receiver transmitter key fob. When the button is push it activates the solenoid or gear motor which pulls the piston and slider back to free the flip latch. To reset the device the flip latch is pushed down on the slider and the piston slides forward to re-engage the lock back into place. Such a system may be powered by a rechargeable battery located behind the solenoid and transmitter. For purposes of maintaining the smallest, lightest form factor the use of disposable batteries may be used instead. The entire mechanics/electronics may be protected by a hard plastic casing that has the capability to be waterproof.

An advantage of the present invention allows a latch released to allow the animal or object to be total free simply with the push of a button.

It is an advantage of the present invention to provide a quick release mechanism for use by handlers with police, military or detection dogs.

It is a further advantage of the present invention to provide for remote actuation of a release mechanism from a hand-grip position.

It is yet another advantage of the present invention to provide such an automated quick release mechanism that is adaptable to various other functions or uses.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMERALS

| | |
|---|---|
| 1. | Bottom Chassis |
| 2. | Top Chassis |
| 3. | Bottom Inner Chassis |
| 4. | Top Inner Chassis |
| 5. | Battery Tube |
| 6. | Batteries |
| 7. | Battery Spring |
| 8. | Battery Cap |
| 9. | Battery Positive Terminal |
| 10. | Swivel Ring |
| 11. | Wireless Circuit |
| 12. | Control Circuit |
| 13. | Power Button |
| 14. | Hall Sensor |
| 15. | Chassis screws |
| 16. | Clasp Screws |
| 17. | Gear Motor |
| 18. | Sear Plate |
| 19. | Slide Plate |
| 20. | Sear Spring |
| 21. | Clasp Spring |
| 22. | Sliding Linkage |
| 23. | Right Linkages |
| 24. | Left Linkages |
| 25. | Right Pin |
| 26. | Left Pin |
| 27. | Clasp Post |
| 28. | LED Night Light |
| 29. | Left Clasp |
| 30. | Right Clasp |
| 31. | Status LED |
| 32. | Eccentric Spur |
| 33. | Wireless Remote Control Receiver Transmitter Key FOB |

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

1. Detailed Description of the Figures

Figure 1:
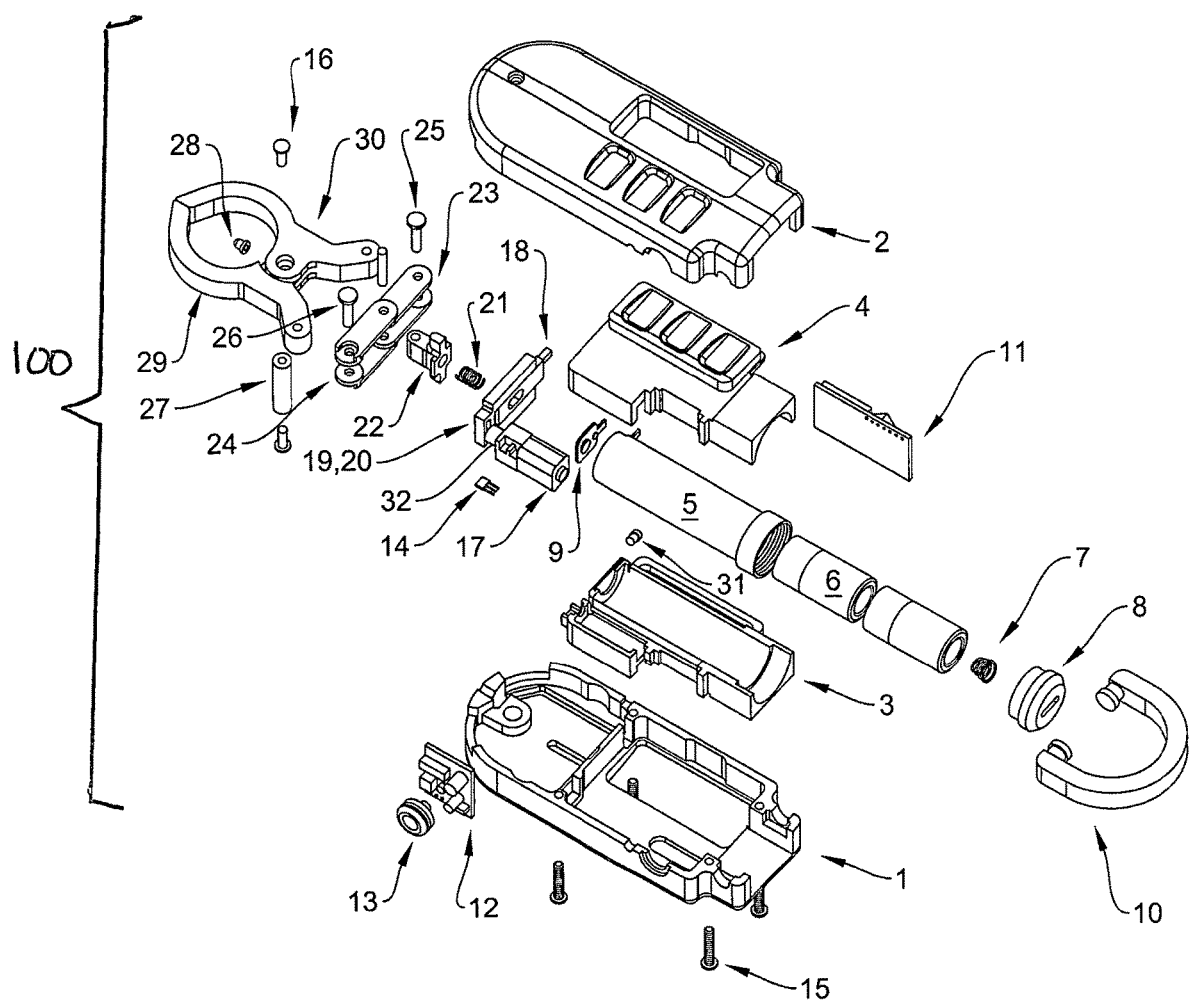
FIG. 1 is an exploded perspective view of a universal quick release according to the preferred embodiment of the present invention.
Figure 2:
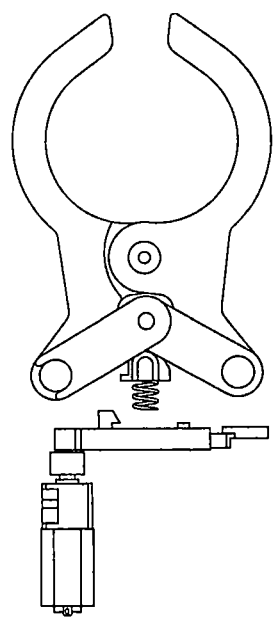
FIG. 2 is a top plan view thereof shown in an open condition.
Figure 3:
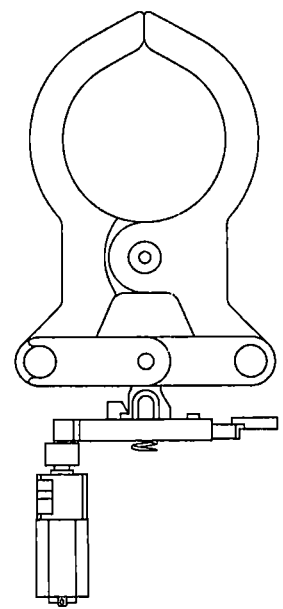
FIG. 3 is a top plan view thereof shown in a closed condition.

Referring now in conjunction with FIG. 1-3, a universal quick release, generally noted as 100, is provided according to the preferred embodiment of the present invention. The quick release 100 has an bottom chassis 1 connected to a top chassis 2 and secured by a number of chassis screws 15. An inner structure formed of a bottom inner chassis 3 connected to a top inner chassis 4 retains a battery tube 5. One or more batteries 6 may be retained within the battery tube 5, with a battery spring 7, battery cap 8 and battery positive terminal 9 providing electrical communication to the gear motor 17.

A swivel ring 10 may be pivotally retained at a proximal end of the quick release 100. The swivel ring 10 may be secured to a leash (not shown) that may be generally formed of a nylon, leather or a similar flexible support. While a person having ordinary skill in various relevant arts may, in light of the present teachings, modify the inventions design and form factor in order to accommodate various aesthetic requirements or functional applications, for purposes of clarity in describing an exemplary enablement the universal quick release 100 may be formed of an approximately 8 inch long by approximately 2 inch wide linear system, with the swivel ring leash attachment 10 forming a D-ring configured to be attached to a leash, rope, chain or any other securing or holding device.

The load attachment is secured, affixed to or held at a distal end of the quick release 100. The load attachment is formed of a grappling clasp formed of a left clap 29 opposite a right clasp 30 that are hingedly connected via a clasp screw 16. The load attachment may actuate by movement of a right linkage 23 relative to a left linkage 24, with the right linkage 23 in communication with the right clasp 30 via a right pin 25 and with the left linkage 24 in communication with the left clasp 20 via a left pin 26. A clasp post 27 connects both linkages 23, 24 to a sliding linking 22. The sliding linkage 22 may be urged forward via a clasp spring 21. The sliding linkage 22 is retained by a sear plate 18 having a sliding plate 19 retained therein. Movement of the sliding plate 19 may release the sliding linkage 22. The gear motor 17 urges the slide plate 19 back and forth relative to the sear plate 18 by rotation of an eccentric spur 32.

A release mechanism is actuated by operation of the gear motor 17. A control circuit 12 operated by a power button 13 may initiate power to the gear motor 17 from a position near the release mechanism. A wireless circuit 11 is further provided for generating a control signal to the gear motor 17 via a wireless actuation button such as wireless remote control receiver transmitter key fob 33. When the key fob button 33 is push, the gear motor 17 is engage to move the slide plate 19 relative to the sear plate 18.

The clasp is manually closed by the user, and then opened wirelessly with the push of a button. The clasp can also be opened by manually pressing the sear plate (18), which is accessible through a small hole in the chassis of the device (1 and 2). This manual open feature is for a dead battery scenario.

The combination of the Sear Plate 18, Slide Plate 19, Sear Spring and Eccentric Spur 32) allow the motor or a manual push to free the sliding linkage 22 and allow it to spring forward to its relaxed state, thus opening the jaws of the clasp. The motor is indexed to a home position by a hall sensor 14, and will complete a full revolution before stopping at the home position again.

The user can attempt to latch the clasp at any time, however, until the eccentric spur arrives at the home position, it may not catch. This timeframe is usually small (0.5-1 seconds).

2. Operation of the Preferred Embodiment

Depending upon the field of use when in operation, the device may be further protected such as to be waterproof or water resistant. Further, a protective housing or cover, such as of hard plastic, may be used for physical protection from impact. In operation, the present invention may be used in conjunction with the handling of police or military dogs. In such an environment, such as when tracking a suspect, a handler may attach a universal quick release between the dog's collar or harness and leash, with the release mechanism attached at the dog's collar or harness. This allows the quick release to be behind the dog but ahead of the handler, allowing the leash to remain out in front of the handler. When a suspect is identified the handler may free his dog by push a key fob button that is located on the handler vest. With a quick release the canine can be total free from the leash and device to allow the dog to apprehend the suspect. With a push on a button on a key fob, the latch is released to allow the animal or object to be total free. In the police and military K9 world when tracking a suspect the handle can attach this device to the dog's collar or harness and then attach any length of leash allowing the K-9 to be out in front of the handler. When the suspect is spotted the handler can free his dog by push a key fob button that is located on the handler vest. With a quick release the K-9 can be total free from the leash and device to allow the dog to apprehend the suspect.

In a similar application, a SWAT team may utilize the present invention during a leash building search. When a dog enters a building and goes into a unsearched room, there is the possibility the dog can get caught and tangled. This puts both dog and handler at risk. Utilizing the present invention the handler can release the dog by remote control, thereby allowing the dog to apprehend the suspect or to be recalled to handler. The form factor created in the Related Application may be adapted to many variations, depending on size, weight, and style of the finished product. This first embodiment is a wireless mechanism operating on 6.6V of lithium ion battery power. The most novel areas of the design are likely to be the mechanical clasp and motorized sear plate. This motorized sear plate has a manual override (18) that can be pressed by a user to open the clasp in the event of battery failure. It's likely that in other form factors, the clasp and sear design would stay the same, whereas the electronics and housing may be different.

The above operation of the universal quick release is described in accordance with use on a collar or harness to release an animal. While such an operation can be further envisioned in a less tactical, more ordinary application, it is felt that the teachings and objects of the present invention may be further applicable as extended to ancillary, but broadly equivalent areas. By way of example, and not as a limitation, when used in conjunction with rock-climbing equipment, a quick release may be used instead of or in conjunction with a quick draw (not shown) to connect ropes to any bolts or anchors. Such a release can then be used to retrieve any rope by actuation of the remote by the user.

By way of another example, and also not as a limitation, when used in conjunction with a boat, a quick release may be used at either end of a belaying line that retains the boat to the dock or pier. Such a release can then be used to allow for a single user launch to retrieve any rope or bumper by the user.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 U.S. 17 (1997) or *Festo Corp.* v. *Shoketsu Kinzoku Kogyo Kabushiki Co.*, 535 U.S. 722 (2002), or other similar case-law or subsequent precedent should not be made if any future claims are added or amended subsequent to this Patent Application.

What is claimed is:

1. A quick release mechanism for use with tactical deployment of police, military or detection dogs capable of being connected between a tether and a collar of the dog comprising:
   a wireless actuation mechanism attachable to a dog handler for communication with a coordinated quick release mechanism;
   a swivel ring pivotally retained at a proximal end of the quick release mechanism;
   a load attachment secured, affixed to or held at a distal end of the quick release mechanism, said load attachment comprising a spring urged grappling clasp formed of:
      a left clap hingedly connected opposite a right clasp;
      an opposed operating linkage for movement of a right linkage relative to a left linkage, with the right linkage in communication with the right clasp via a right pin and with the left linkage in communication with the left clasp via a left pin;
      a clasp post connecting the left linkage and right linkage to a central sliding linking;
      a clasp spring connected to the central sliding linkage, wherein the clasp spring is retained within a sliding plate when the grappling clasp is in a closed position; and a gear motor in operative communication with the wireless actuation mechanism,
      wherein said the sliding plate is moved relative to a sear plate by rotation of an eccentric spur rotated by the gear motor;
   wherein said grappling clasp is manually closed, and then opened either wirelessly with the push of a button or manually pressing the sear plate and a sear spring; said grappling clasp configured to attach to and detach from the dog collar and said swivel ring configured to attach to the tether.

2. The quick release mechanism of claim 1, wherein the swivel ring comprises a D-ring and the tether is formed of linear length of nylon, leather or similar flexible support strap.

3. The quick release mechanism of claim 1 formed within a form factor of no more than 8 inches long by no more than approximately 2 inches wide.

4. The quick release mechanism of claim 1, wherein the clasp spring for urging the sliding linkage to a retainer within a sliding plate has a spring constant sufficient to open and release the collar.

5. The quick release mechanism of claim 4, wherein said gear motor rotates at a sufficient speed to close the grappling clasp.

6. A method for remotely releasing a tether from a load comprising:
   a. obtaining a quick release mechanism of claim 1;
   b. affixing a load to the release mechanism;
   c. securing the tether to the swivel ring; and
   d. remotely releasing the release mechanism by the wireless actuation mechanism, whereby the gear motor rotates the eccentric spur to slide the sliding plate relative to the sear plate to release clasp post.

7. The method of claim 6, wherein said tether is affixed to a leash and the load comprises a collar worn by a canine.

* * * * *